Patented May 12, 1936

2,040,801

UNITED STATES PATENT OFFICE 2,040,801

METHOD FOR PRODUCTION OF CELLULOSIC MATERIALS FROM WASTE CELLULOSE PRODUCTS

Wyly M. Billing, Hopewell, Va., assignor to Hercules Powder Company, Wilmington, Del., a corporation of Delaware No Drawing. Application June 13, 1934, Serial No. 730,463

16 Claims. (Cl. 260—10)

This invention relates to a method for the production of cellulosic materials, as for example, regenerated cellulose; cellulose esters, as, cellulose nitrate, cellulose acetate, etc.; cellulose ethers, as benzyl cellulose, ethyl cellulose, etc., from waste cellulose products; and more particularly from reclaimed mattress stuffing.

Raw cotton fibres and certain grasses and wood pulps are the present sources of cellulose for the production of regenerated cellulose, cellulose esters and ethers. These materials are subjected to a purification process which effects a removal of the unwanted constituents and leaves a product which is essentially pure alpha-cellulose.

While waste cellulose products, such as reclaimed mattress stuffing, afford a cheap source of cellulose, it has hitherto been considered impossible to purify these waste products so that they may be used in the preparation of regenerated cellulose or cellulose derivatives of requisite purity.

Mattress stuffing reclaimed from old mattresses comprises a variety of cotton fibres in admixture with such impurities as, for example, excelsior, wood shavings, rags, feathers, jute, hemp, straw, cotton stalks, cotton bolls, etc. The cotton present is of a very low grade, since the better grades are used in textiles.

Mechanical separation of the cotton present in such a heterogenous mass is quite obviously impracticable. Chemical purification of the reclaimed mattress stock to alpha-cellulose is likewise impracticable, since chemical treatment strong enough to dissolve out and remove the more resistant impurities present will so damage the cotton fibres that a purified product suitable for use in the production of regenerated cellulose or of cellulose esters or ethers can only be obtained in very uneconomical yields.

From the viewpoint of chemical composition the impurities present in reclaimed mattress stuffing can be classified into two groups. One group comprising the oils, fats, waxes, lignins, pectins, gums, proteins, etc. is solubilized by dilute alkali at a steam pressure of from 25 to 100 lbs./sq. in. and can accordingly be removed by the caustic or alkali cook customarily used in the purification of raw cotton fibres to alpha-cellulose. The second group, however, comprising the unpulped lignocelluloses and adipocelluloses contained, for example, in the cotton stalks, leaves, stems and bolls, cannot be solubilized and removed by the treatment referred to above, or by any treatment not deleterious to the cotton fibres.

It has been found, however, in accordance with this invention that these unremovable impurities referred to above can be permitted to remain in the partially purified cellulosic material obtained from reclaimed mattress stuffing during the conversion of this material into the desired cellulosic material, such as regenerated cellulose, cellulose esters, cellulose ethers, etc. without having any harmful effect in the necessary reactions for such conversions. These impurities are not only without harmful effect upon the respective reactions, but are themselves either not substantially affected or transformed by the reactions and hence remain insoluble, or are converted into products which remain insoluble in the reaction mixtures. Consequently they can be easily and readily removed from the reaction product comprising the converted cellulosic material by, for example, simple filtration of a solution of the latter at some stage in or after its production. The cellulosic materials obtained after such separation of the impurities brought into it from the reclaimed mattress stuffing used as a source of cellulose will be entirely the equal in any and every respect of like products produced from a substantially pure alpha-cellulose made by purification of, for example, raw cotton linters.

The method in accordance with this invention for the production of cellulosic materials from reclaimed mattress stuffing will accordingly comprise a two-stage procedure. The first stage of procedure involves the purification of the reclaimed mattress stuffing by cooking with alkali under pressure for the removal therefrom of such impurities as are solubilized thereby. This alkali or caustic cook is essentially the same known purification treatment as is utilized in the purification of cotton linters to produce a high alpha-cellulose product. It may be followed by bleaching treatment, just as is the case when cotton linters are processed.

The alkali cook serves both to remove impurities and to reduce the viscosity of the cellulose. The viscosity of the cellulose must be reduced to within a predetermined range, if the purified product is to be used for certain purposes, as for example, the manufacture of viscose, and accordingly the alkali cook must be continued until the desired reduction is effected.

Surprisingly, it has been found in accordance with this invention that the viscosity of the cellulose present in reclaimed mattress stuffing is much lower than the viscosity of cellulose present in raw cotton. Thus, cellulose from reclaimed mattress stuffing has a viscosity, after extraction with ether for the removal of fats, etc., of the order of 200–500 seconds as measured by the official American Chemical Society method, while cellulose from native cotton, as cotton linters, has a viscosity, after extraction with ether, of the order of 5000 seconds on the same scale as calculated by conversion of the direct measurements made in more dilute solution. (Direct measurement of such viscosities by the A. C. S. method is not possible.)

Accordingly, while the concentrations of alkali and pressures used in the purification of reclaimed mattress stock will be essentially the same as those employed for the purification of cotton linters, the time of treatment may be much less since a much smaller reduction in viscosity of the cellulose need be effected. This results in economies in steam consumption and in time of treatment.

The washing and bleaching treatments following the caustic cook will be the same as those used in the purification of cotton linters.

The second stage of procedure in the method in accordance with this invention involves the conversion of the partially purified mattress stock containing impurities not removed in the first stage into a regenerated cellulose, cellulose esters, cellulose ethers, etc. The partially purified mattress stock will be converted into these products by treatment by any of the known methods for the production of these materials from pure cellulose. Thus the partially purified mattress stock may be treated with copper-ammonium hydroxide or with alkali and carbon disulfide for the production of regenerated cellulose, with nitric and sulfuric acids for the production of cellulose nitrate, with acetic anhydride and its homologues for the production of cellulose acetate and homologous esters, and with alkali and benzyl or ethyl chloride for the production of cellulose ethers. The only important variation which may be introduced in the respective reactions as applied to pure cellulose as a raw material will be to effect separation of the impurities present, for example, by filtration, at some stage in the reaction when the cellulosic material is in solution. If desired, the separation may be effected after completion of the reaction by dissolving the cellulosic material containing the impurities in a solvent and filtering the solution. In all other respects the various reactions can be conducted in the same manner as if pure cellulose were used as the raw material instead of the partially purified mattress stock.

The various reactions involving the method in accordance with this invention specifically set forth in the following examples will serve to illustrate its wide applicability.

Example I

Preparation of regenerated cellulose cuprammonium process 500 grams of reclaimed mattress stock are immersed in 5 liters of a 2.5% aqueous solution of NaOH. The stock and solution are charged into a pressure cooker or keir and brought by injection of steam to a pressure of 25 lbs. per square inch. The stock is maintained at this pressure for from 3 to 4 hours. The pressure is then released and the stock well washed with water to remove the excess caustic as well as the dissolved impurities. The stock is then bleached at a temperature of 115° F. for one hour with a solution of sodium hypochlorite containing 0.025% available chlorine. The stock is then washed again and after souring with 0.025% sulphuric acid it may, if desired, be again bleached at room temperature to obtain a better color. At this stage the stock will have a chemical analysis substantially as follows:

| | |
|---|---|
| Viscosity (A. C. S.) | 175 seconds |
| Soda soluble | 3.00 per cent |
| Ash | 0.20 per cent |
| Alpha cellulose | 98.5 per cent |
| Ether extract | 0.2 per cent |

The above chemical analysis might indicate that the product is suitable for most chemical purposes but it will be noted by inspection that particles of wood, trash, straw, jute and hemp still remain. These can be readily shown up by proper staining with a dye, as safranine or ruthenium red, or by solution of the cellulose in 72% sulphuric acid. The stock would accordingly be considered as only partially purified and unfit for use in chemical processes.

However, this partially purified stock may be directly converted into regenerated cellulose, cellulose esters, cellulose ethers, etc. by the method in accordance with this invention either immediately following the purification procedure referred to above or at any later period.

Thus, such partially purified cellulose while containing, say, 40–60% water may be dissolved by churning in any desirable concentration of a copper solution, such as a basic copper sulphate solution or a copper hydroxide-ammonia solution. The resulting solution, which still contains the caustic soda insoluble impurities of the reclaimed mattress stock, is then filtered through, for example, finely woven nickel cloth, for the removal of these impurities, leaving a solution of cellulose fully the equal of those obtained from completely purified cotton fibers, and suitable for such purposes as making films or threads of regenerated cellulose. It can, therefore, be used for all such purposes in the same manner as the solutions from completely purified cellulose now find employment.

Example II

Preparation of cellulose acetate 500 grams of reclaimed mattress stock are immersed in 5 liters of 2.0% aqueous NaOH solution. The pulp and solution are charged into a pressure cooker and the whole raised to a steam pressure of, say, 65 lbs. per square inch which is maintained for from 4 to 5 hours. The pressure is then released and the stock washed to remove the excess caustic and the dissolved or soluble impurities. The pulp is then bleached with 0.025% available chlorine bleach as, for example, a sodium hypochlorite solution, at 115° for one hour, washed, soured in 0.025% acid, and rebleached with a 0.025% available chlorine bleach as before. After again souring with acid the product is dried. The product at this point will have the following analysis:

| | |
|---|---|
| Viscosity (A. C. S.) | 10 seconds |
| Alpha cellulose | 96 per cent |
| Soda solubility | 5 per cent |
| Ether extract | 0.2 per cent |

As in Example I, this analysis is indicative of chemical suitability but, despite the higher pressure of cooking, the product contains an undesirable amount of impurities, which can be shown up by staining or solution in 72% sulphuric acid, as previously mentioned.

The dried, partially purified stock, however, may be directly acetylated and hydrolyzed by any known process for making cellulose acetate. When the cellulose has been acetylated to a point at which it dissolves in the acetylating mixture, or during the process of ripening or hydrolysis of the dissolved cellulose acetate, the acetate solution may be filtered to remove the insoluble impurities after which the cellulose acetate may be precipitated from solution in the usual manner. It is also possible to precipitate the cellulose acetate together with the insoluble impurities by ordinary methods and after drying, dissolve the acetate in a solvent, as acetone, and filter or centrifuge the solution to remove the insoluble impurities. The resulting acetone solution may be cast into films or spun into threads. The cellulose acetate produced is in all respects fully the equivalent of the product made from completely purified cellulose.

Example III

*Preparation of regenerated cellulose by the viscose process*

500 grams of reclaimed mattress stock are immersed in approximately 4 liters of a 2.5% aqueous solution of NaOH. A small quantity of a detergent, as for, example, a soap or fatty acid (about 8 grams) may be added in order to secure a better scouring action. The stock and solution are charged into a digester and brought by injection of steam to a pressure of 80 lbs. per square inch, which is maintained for 3 to 4 hours. The pressure is then released and the stock well washed with water to remove the excess caustic and the dissolved impurities.

The stock is then bleached with sodium hypochlorite, substantially as described in the above example. It is then beaten in a hollander beater and pumped through a Jordan engine to reduce the fiber length and to eliminate knots in the stock. The foreign material not removed in the digestion and bleaching, such as woody material and trash, will be comminuted but will, nevertheless, remain in the stock. After the stock is adjusted to the proper consistency it may be lead out on a Fourdrinier wire or screen, as is customary in paper making, and finally dried in a sheeted condition. At this step the stock will have a chemical analysis, substantially as follows:

Viscosity (A. C. S.) _____ 12 seconds
Soda solubility _____ 3.5 per cent
Ash _____ 0.18 per cent
Alpha cellulose _____ 98.0 per cent
Ether extract _____ 0.15 per cent The above analysis indicates that the product would be suitable for use in making viscose, but inspection by staining or solution in sulphuric acid will show that it still contains finely comminuted non-alpha-cellulose impurities. However, despite the presence of these impurities the partially purified stock may be used directly in the manufacture of the viscose in, for example, the following manner.

100 grams of the partially purified stock, which may be in sheeted form, reduced to the proper size, are steeped in 2½ liters of an 18% aqueous sodium hydroxide solution at 18° C. After steeping, which effects mercerization and formation of alkali cellulose, the excess caustic solution is expressed by use of a hydraulic press to such a point that the stock and retained caustic solution weigh approximately 300 grams. The alkali cellulose made in this manner will contain about 31.5% of cellulose and 15.6% of NaOH.

The alkali cellulose is then shredded in a Baker Perkins shredder to produce a loose fluffy mass. This alkali cellulose should then be aged, at a proper temperature and for a sufficient time, in order to produce a viscose of the desired viscose-viscosity. With the 12 second product described above it would be desirable to age at 18° C. for about 96 hours.

After aging the alkali cellulose is introduced into a tumbler barrel or xanthator into which 32.2 grams of carbon disulphide are introduced. The mass is churned for about 2 hours at a temperature of 25° C. The cellulose xanthate, which is contaminated with insoluble, unxanthated impurities, is dissolved in an alkali solution of sufficient concentration to give a viscose solution containing about 7% of cellulose and 6% NaOH.

This viscose solution, like any other viscose, must then be ripened at about 18 to 20° C. for a period of from 48 to 72 hours in order to produce the correct degree of coagulability, as measured by its salt index. During this period of ripening the viscose solution may be separated from the impurities present. This is readily accomplished by filtration of the solution. Since the solution is less viscous than that described in Example I, and since fine cambric or cotton batting will not be affected by the solution, such materials may be used as filtering mediums. It may be desirable to effect separation of the impurities by super-centrifugation, since the finely comminuted particles of unxanthated impurities cannot readily be removed by filtration.

At the desired coagulability the viscose solution should have a viscosity at 18° C. of 35 poises, which is considered satisfactory for extrusion, as in sheeting or spinning, which may be performed in the usual manner. The regenerated cellulose so produced is fully the equal of that made from completely purified cotton linters.

Example IV

*Preparation of nitrocellulose*

500 grams of reclaimed mattress stock are treated with 3½ liters of a 2.5% aqueous solution of NaOH. The mixture is charged into a digester and raised to a steam pressure of about 70 lbs. per square inch which is maintained for from 3 to 4 hours. The pressure is then released and the material washed and bleached, substantially as described in the previous examples, after which it is dried to a moisture content of 1% or less. At this stage the product will have an analysis substantially as follows:

Viscosity (A. C. S.) _____ 35 seconds
Alpha cellulose _____ 98.5 per cent
Soda solubility _____ 3.5 per cent
Ether extract _____ 0.2 per cent
Ash _____ 0.20 per cent This product may be nitrated with any suitable nitrating acid, but low temperature, short-time nitrations, to low nitrogen contents are preferable, in order to minimize the dangers due to any decomposition of the impurities subsequent to nitration. Thus, 61 grams of this dry material may be nitrated at a temperature of about 36° C. for a period of 20 minutes with about 2700 grams of mixed acid consisting essentially of 25% nitric acid, 56% sulphuric acid and 19% water. An 11% nitrogen type of nitrocellulose is obtained.

After nitration the product is centrifuged in order to remove the excess acid, washed in water, and finally boiled in 0.1% sulphuric acid in order to effect stabilization, after which it may be boiled in neutral water. The product may be dried by heat or de-hydrated with alcohol in the customary manner.

If nitrocellulose plastics are to be made, the nitro-cotton is colloided in a suitable solvent, for example, camphor and alcohol, as is usual in the production of nitrocellulose plastics. The whole colloided mass is then put into a hydraulic press and extruded through a fine screen. It will be found that substantially all of the impurities brought in from the original mattress stock and not removed during the preliminary purification remain in the heel of the stock left in the press. After this hydraulic filtration, the extruded nitrocellulose plastic, with excess solvent, may be worked up into such articles as sheets, rods, tubes, etc., which are substantially equal to those made from nitrocellulose made from a fully purified cellulose.

The procedure is not limited to the production of low nitrogen products, and higher nitrogen products can also be made, attended, however, by greater risks of decomposition and fire.

*Example V*

*Preparation of nitrocellulose*

Thus, a 12% nitrogen type of nitrocellulose may be produced by lowering the water content of the acid in the above example to about 17% with a corresponding increase in the strength of the acids. The nitrating temperature may also be increased up to about 45 or 50° C. with the production of a very low viscosity nitrocellulose. This material, after stabilization, may be dissolved in a suitable solvent, such as, for example, acetone, etc., to form a relatively thin solution which can be easily filtered to remove impurities brought in from the mattress stock. The nitrocellulose so produced may be cast in films or used in any way in which nitrocellulose produced from completely purified cotton linters, with which it is fully comparable, may be used.

The method in accordance with this invention will be seen to be directed broadly to the production of cellulosic materials, as for example, regenerated cellulose, cellulose esters, cellulose ethers, etc. from waste cellulose products, as reclaimed mattress stuffing or stock, etc. Accordingly it is to be understood that it is not limited to the specific procedures and processes set forth herein by way of example only, but is only limited by the claims hereinafter set forth.

What I claim and desire to protect by Letters Patent is:

1. The method of producing a cellulosic material which includes subjecting reclaimed mattress stuffing to treatment adapted to remove a portion of the non-alpha-cellulose constituents thereof, treating the partially purified material so produced to form a solution of alpha-cellulosic material in which non-alpha-cellulosic material is insoluble, separating the insoluble non-alpha-cellulosic materials derived from said partially purified mattress stuffing from said solution, and recovering a cellulosic material from said solution.

2. The method of producing a cellulosic material which includes subjecting reclaimed mattress stuffing to treatment adapted to remove a portion of the non-alpha-cellulose constituents thereof, dissolving the alpha-cellulose out of the partially purified material so produced, separating the insoluble non-alpha-cellulosic materials derived from said partially purified mattress stuffing from said solution, and recovering regenerated cellulose from said solution.

3. The method of producing a cellulosic material which includes subjecting reclaimed mattress stuffing to treatment adapted to remove a portion of the non-alpha-cellulose constituents thereof, treating the partially purified material so produced to effect formation of a soluble chemically substituted cellulose from the alpha-cellulose portion thereof, dissolving said chemically substituted cellulose in a solvent therefor which is a non-solvent for the non-alpha-cellulosic materials derived from said partially purified mattress stuffing, separating said non-alpha-cellulosic materials from said solution, and recovering a chemically substituted cellulose from said solution.

4. The method of producing a cellulosic material which includes subjecting reclaimed mattress stuffing to treatment adapted to remove a portion of the non-alpha-cellulose constituents thereof, treating the partially purified material so produced to effect formation of a soluble cellulose ester from the alpha-cellulose portion thereof, dissolving said cellulose ester in a solvent therefor which is a non-solvent for the non-alpha-cellulosic materials derived from said partially purified mattress stuffing, separating said non-alpha-cellulosic materials from said solution, and recovering a cellulose ester from said solution.

5. The method of producing a cellulosic material which includes subjecting reclaimed mattress stuffing to treatment adapted to remove a portion of the alpha-cellulose constituents thereof, treating the partially purified material so produced to effect formation of cellulose nitrate from the alpha-cellulose portion thereof, dissolving said cellulose nitrate in a solvent therefor which is a non-solvent for the non-alpha-cellulosic materials derived from said partially purified mattress stuffing, separating said non-alpha-cellulosic materials from said solution, and recovering cellulose nitrate from said solution.

6. The method of producing a cellulosic material which includes subjecting reclaimed mattress stuffing to treatment adapted to remove a portion of the alpha-cellulose constituents thereof, treating the partially purified material so produced to effect formation of cellulose xanthate from the alpha-cellulose portion thereof, dissolving said cellulose xanthate in a solvent therefor which is a non-solvent for the non-alpha-cellulosic materials derived from said partially purified mattress stuffing, separating said non-alpha-cellulosic materials from said solution, and recovering regenerated cellulose from said solution.

7. The method of producing a cellulosic material which includes subjecting reclaimed mattress stuffing to treatment adapted to remove a portion of the non-alpha-cellulose constituents thereof, dissolving the alpha-cellulose out of the partially purified material so produced with a basic cupric solution, separating the insoluble non-alpha-cellulosic materials derived from said partially purified mattress stuffing from said solution, and recovering regenerated cellulose from said solution.

8. The method of producing a cellulosic material which includes subjecting reclaimed mattress stuffing to treatment with dilute aqueous alkali solution at an elevated temperature to effect removal of the alkali soluble non-alpha-cellulose constituents thereof, treating the partially purified material so produced to form a solution of alpha-cellulosic material in which non-alpha-cellulosic material is insoluble, separating the insoluble non-alpha-cellulosic materials derived from said partially purified mattress stuffing from said solution, and recovering a cellulosic material from said solution.

9. The method of producing a cellulosic material which includes subjecting reclaimed mattress stuffing to treatment with dilute aqueous alkali solution at an elevated temperature to effect removal of the alkali soluble non-alpha-cellulose constituents thereof, dissolving the alpha-cellulose out of the partially purified material so produced, separating the insoluble non-alpha-cellulosic materials derived from said partially purified mattress stuffing from said solution, and recovering regenerated cellulose from said solution.

10. The method of producing a cellulosic material which includes subjecting reclaimed mattress stuffing to treatment with dilute aqueous alkali solution at an elevated temperature to effect removal of the alkali soluble non-alpha-cellulose constituents thereof, treating the partially purified material so produced to effect formation of a soluble chemically substituted cellulose from the alpha-cellulose portion thereof, dissolving said chemically substituted cellulose in a solvent therefor which is a non-solvent for the non-alpha-cellulosic materials derived from said partially purified mattress stuffing, separating said non-alpha-cellulosic materials from said solution, and recovering a chemically substituted cellulose from said solution.

11. The method of producing a cellulosic material which includes subjecting reclaimed mattress stuffing to treatment with dilute aqueous alkali solution at an elevated temperature to effect removal of the alkali soluble non-alpha-cellulose constituents thereof, treating the partially purified material so produced to effect formation of a soluble cellulose ester from the alpha-cellulose portion thereof, dissolving said cellulose ester in a solvent therefor which is a non-solvent for the non-alpha-cellulosic materials derived from said partially purified mattress stuffing, separating said non-alpha-cellulosic materials from said solution, and recovering a cellulose ester from said solution.

12. The method of producing a cellulosic material which includes subjecting reclaimed mattress stuffing to treatment with dilute aqueous alkali solution at an elevated temperature to effect removal of the alkali soluble non-alpha-cellulose constituents thereof, treating the partially purified material so produced to effect formation of cellulose nitrate from the alpha-cellulose portion thereof, dissolving said cellulose nitrate in a solvent therefor which is a non-solvent for the non-alpha-cellulosic materials derived from said partially purified mattress stuffing, separating said non-alpha-cellulosic materials from said solution, and recovering cellulose nitrate from said solution.

13. The method of producing a cellulosic material which includes subjecting reclaimed mattress stuffing to treatment with dilute aqueous alkali solution at an elevated temperature to effect removal of the alkali soluble non-alpha-cellulose constituents thereof, treating the partially purified material so produced to effect formation of cellulose xanthate from the alpha-cellulose portion thereof, dissolving said cellulose xanthate in a solvent therefor which is a non-solvent for the non-alpha-cellulosic materials derived from said partially purified mattress stuffing, separating said non-alpha-cellulosic materials from said solution, and recovering regenerated cellulose from said solution.

14. The method of producing a cellulosic material which includes subjecting reclaimed mattress stuffing to treatment with dilute aqueous alkali solution at an elevated temperature to effect removal of the alkali soluble non-alpha-cellulose constituents thereof, dissolving the alpha-cellulose out of the partially purified material so produced with a basic cupric solution, separating the insoluble non-alpha-cellulosic materials derived from said partially purified mattress stuffing from said solution, and recovering regenerated cellulose from said solution.

15. The method of producing a cellulosic material which includes subjecting reclaimed mattress stuffing to treatment with dilute aqueous alkali solution at an elevated temperature to effect removal of the alkali soluble non-alpha-cellulose constituents thereof, bleaching the treated material, treating the partially purified material so produced to form a solution of alpha-cellulosic material in which non-alpha-cellulosic material is insoluble, separating the insoluble non-alpha-cellulosic materials derived from said partially purified mattress stuffing from said solution, and recovering a cellulosic material from said solution.

16. A cellulosic material suitable for chemical treatment for the production of cellulose derivatives therefrom comprising reclaimed mattress stuffing that has been partially purified by chemical treatment but still contains non-alpha-cellulosic impurities detectable by staining with a suitable dye and unremovable from said material by chemical methods that are non-deleterious to the cellulose present, said non-alpha-cellulosic impurities being substantially without harmful effect on reactions for the production of cellulose derivatives from said material and being insoluble in solvents for alpha-cellulose.

WYLY M. BILLING.